(12) United States Patent
Sakai

(10) Patent No.: US 12,124,751 B2
(45) Date of Patent: Oct. 22, 2024

(54) INFORMATION PROCESSING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Hiroyuki Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/476,115

(22) Filed: Sep. 27, 2023

(65) Prior Publication Data
US 2024/0111467 A1   Apr. 4, 2024

(30) Foreign Application Priority Data
Sep. 30, 2022   (JP) .................. 2022-158763

(51) Int. Cl.
*G06F 3/12*   (2006.01)
(52) U.S. Cl.
CPC .......... *G06F 3/1254* (2013.01); *G06F 3/1204* (2013.01); *G06F 3/125* (2013.01)
(58) Field of Classification Search
CPC .... G06F 3/1204; G06F 3/1205; G06F 3/1253; G06F 3/1254; G06F 3/125; H04N 1/00639

USPC ................................ 358/1.15, 1.18
See application file for complete search history.

(56) References Cited

U.S. PATENT DOCUMENTS

| 2014/0078539 | A1* | 3/2014 | Kakitsuba | G06F 3/1208 358/1.13 |
| 2019/0303078 | A1* | 10/2019 | Miyagi | G06F 3/1253 |
| 2020/0412884 | A1* | 12/2020 | Kubota | H04N 1/3877 |

FOREIGN PATENT DOCUMENTS

| JP | 2015225482 A | 12/2015 |
| JP | 2019177583 A | 10/2019 |

* cited by examiner

*Primary Examiner* — Kent Yip
(74) *Attorney, Agent, or Firm* — Canon U.S.A., Inc. IP Division

(57) ABSTRACT

An information processing apparatus includes at least one processor and at least one memory storing a computer-readable program executable by the processor, the at least one processor and the at least one memory are operatively coupled to function as an acquisition unit that acquires image data by an application for causing a printer corresponding to a printer driver to execute printing, and a setting unit that, if an instruction to execute double-sided printing of the image data is accepted by the application, decides a binding setting of a document to print the image data based on information of the image data acquired by the acquisition unit, and set the decided binding setting for the printer driver.

19 Claims, 6 Drawing Sheets

INFORMATION PROCESSING APPARATUS, METHOD, AND NON-TRANSITORY COMPUTER-READABLE STORAGE MEDIUM STORING PROGRAM

BACKGROUND

Field

The present disclosure relates to an information processing apparatus capable of executing a print setting, a method, and a non-transitory computer-readable storage medium storing a program.

Description of the Related Art

In recent years, mobile terminals such as smartphones and tablet PCs are widely used. The functions of a printer have also improved, and an environment has been constructed in which the printer can be connected to various terminals via a network. Further, there are various types of printers. In addition to conventional home printers, types of business printers such as a large format printer, a professional printer, and a copy machine are increasing. Many printers that have a double-sided print setting function have been commercialized. A PC to be connected to the printer is installed with a printer driver including various kinds of print setting functions that change for each model of the printer. When a user selects double-sided printing in a print setting, double-sided printing can be executed if the printer supports the double-sided printing function.

By setting the sheet orientation and the binding direction in the print setting for double-sided printing, it is possible to change the print direction between the obverse surface and the reverse surface. Japanese Patent Laid-Open No. 2015-225482 describes that the print setting UI internally holds "long-side binding" and "short-side binding" as the binding direction, and dynamically displays the print direction on the reverse surface of the print sheet with animation. Japanese Patent Laid-Open No. 2019-177583 describes that the second rotation processing is performed on the print target image so that the orientation of the print target image transmitted from the terminal apparatus returns to the orientation before the first rotation processing is performed by the terminal apparatus, and then single-sided printing is executed.

SUMMARY

There is a demand for further improving the convenience in setting upon executing double-sided printing.

The present disclosure provides a mechanism for improving the convenience in setting upon executing double-sided printing.

The present disclosure in one aspect provides an information processing apparatus includes at least one processor and at least one memory storing a computer-readable program executable by the processor, wherein the at least one processor and the at least one memory are operatively coupled to function as an acquisition unit that acquires image data by an application for causing a printer corresponding to a printer driver to execute printing, and a setting unit configured to, if an instruction to execute double-sided printing of the image data is accepted by the application, decide a binding setting of a document to print the image data based on information of the image data acquired by the acquisition unit, and set the decided binding setting for the printer driver.

According to the present disclosure, it is possible to improve the convenience in setting upon executing double-sided printing.

Further features of the present disclosure will become apparent from the following description of exemplary embodiments with reference to the attached drawings.

DESCRIPTION OF THE EMBODIMENTS

Figure 1:
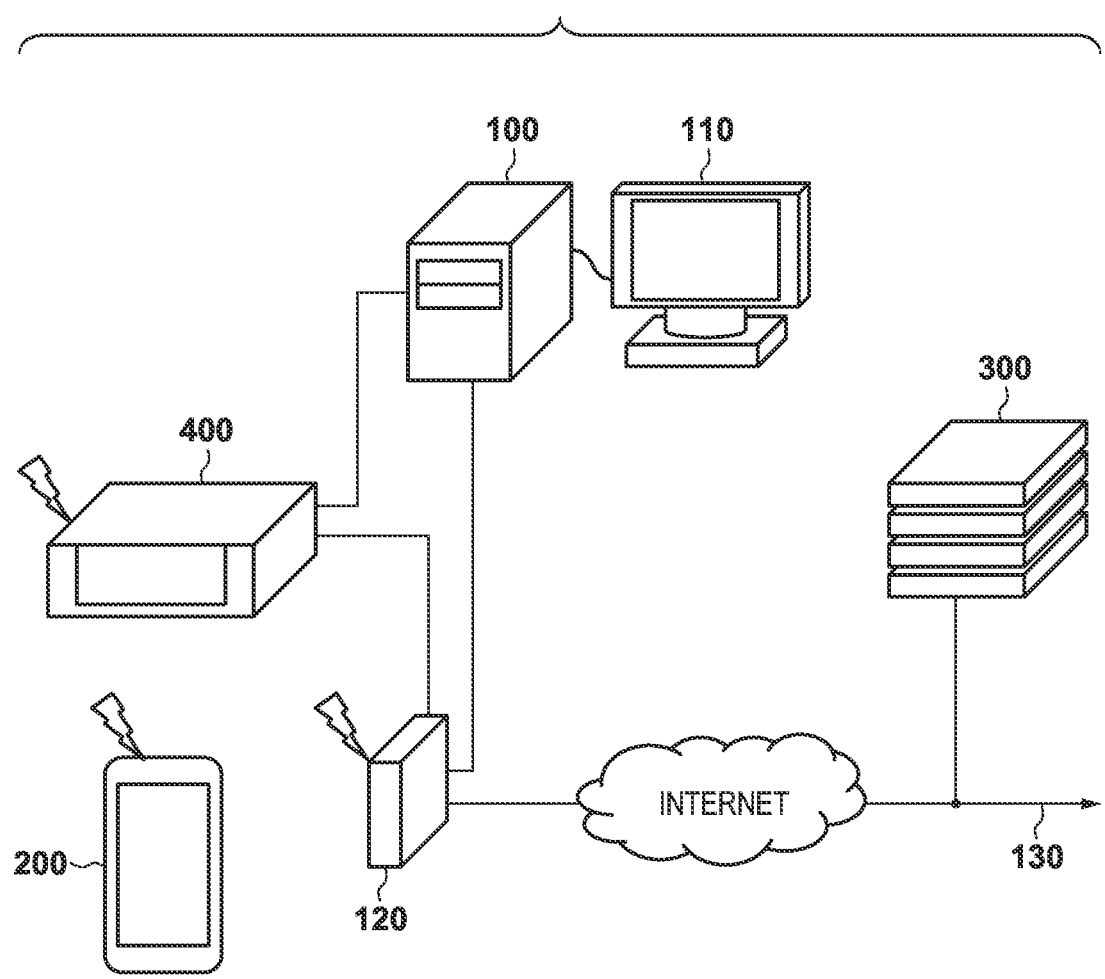
FIG. 1 is a view showing the configuration of a printing system.

Hereinafter, embodiments will be described in detail with reference to the attached drawings. Note, the following embodiments are not intended to limit the scope of the attached claims. Multiple features are described in the embodiments, but limitation is not made a disclosure that requires all such features, and multiple of such features may be combined as appropriate. Furthermore, in the attached drawings, the same reference numerals are given to the same or similar configurations, and redundant description thereof is omitted.

First Embodiment

FIG. 1 is a view showing an example of the configuration of a printing system in this embodiment. This printing system includes a client computer (to be referred to as a PC hereinafter) 100, a display (display apparatus) 110, a router 120, a mobile terminal 200, a server computer (to be referred to as a server hereinafter) 300, and a printer 400. The PC 100 is connected to the display 100 by a communication cable, and displays various kinds of user interface screens on the display 110 for the user of the PC 100. An information processing apparatus may include not only the PC 100 itself but also the PC 100 and the display 110. The PC 100 is also connected to the router 120 by wired communication or wireless communication, and can mutually communicate with another communication equipment through Internet 130 via the router 120. The mobile terminal 200 can mutually communicate with the other communication equipment through the Internet 130 via the router 120 by wireless communication. The server 300 is, for example, a Web server that provides a Web application by which the user can create/edit content data to be printed. The server 300 can mutually communicate with the other communication equipment through the Internet 130. The server 300 receives data held by the PC 100 or the mobile terminal 200, and stores it in a memory. The server 300 can process the data, or transmit the data to the other communication equipment such as the PC 100. The printer 400 receives data stored in the PC 100, the mobile terminal 200, or the server 300, and prints it on a print medium such as a print sheet.

In the printing system shown in FIG. 1, the user of the PC 100 can print, by the printer 400, the content created using the Web application of the server 300. The user of the PC 100 can also print the print target content by the printer 400 while using not the Web application of the server 300 but the native application installed on the PC 100 in advance. By associating the Web application and the native application with each other in advance, the user of the PC 100 can print the content, which has been created by the Web application, by the printer 400 via the native application. In this embodiment, the application used by the user to print the content on the PC 100 is simply referred to as the "application" regardless of the above-described modes. The hardware arrangement of each apparatus shown in FIG. 1 will be described below.

Figure 2:
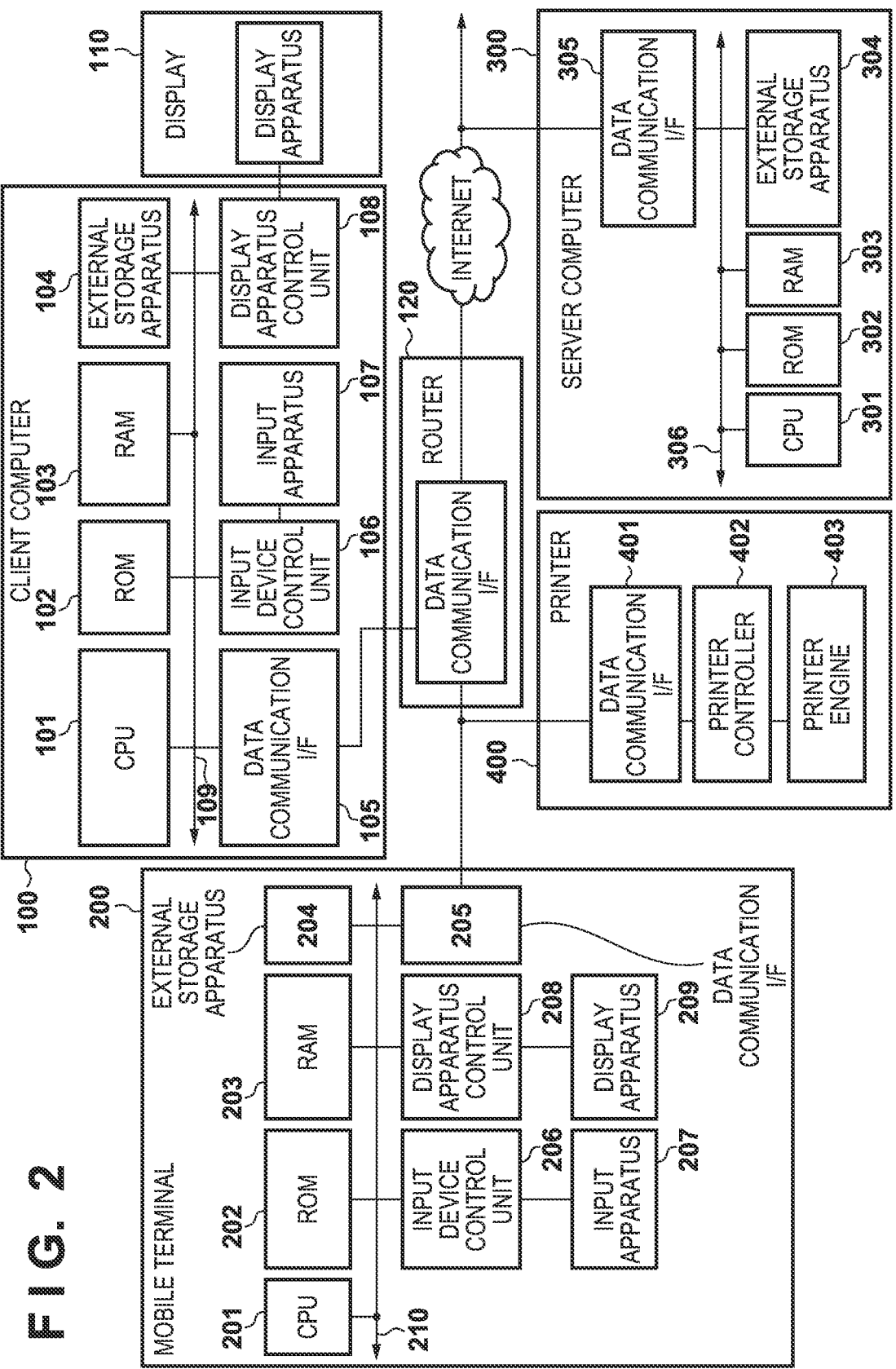
FIG. 2 is a view showing the hardware arrangement of each apparatus.

FIG. 2 is a view showing an example of the hardware arrangement of each apparatus of the printing system shown in FIG. 1. First, the hardware arrangement of the PC 100 will be described. A CPU 101 is a central processing unit, and comprehensively controls the PC 100 serving as the information processing apparatus. A ROM 102 is a nonvolatile storage, and holds various kinds of data and programs. For example, a basic program and various kinds of application programs are stored in the ROM 102. The application programs include, for example, the print application program downloaded from an external server and installed, and the frontend program in the Web application of the server 300. A RAM 103 is a volatile storage, and temporarily holds programs and data. An external storage apparatus 104 is a nonvolatile storage such as a Hard Disk Drive (HDD) or a Solid State Drive (SSD), and holds programs and data. The CPU 101 executes various kinds of processes based on the programs and data stored in the ROM 102, the RAM 103, and the external storage apparatus 104. For example, the operation of the PC 100 in this embodiment is implemented when the CPU 101 reads out the program stored in the ROM 102 into the RAM 103 and executes the program.

A data communication interface (UF) 105 executes data communication with external equipment. For example, the data communication OF 105 controls, via the router 120, data transmission/reception with the server 300 and the printer 400. As the data communication method, for example, a wired connection method such as a USB, IEEE 1394, or a LAN, or a wireless connection method such as Bluetooth® or WiFi® is used. An input device control unit 106 acquires information concerning a user operation accepted via an input apparatus 107, and transmits the information to the CPU 101. The input apparatus 107 is a Human Interface Device (HID) including a keyboard, a mouse, and the like. A display apparatus control unit 108 converts screen data for the user interface screen or the like into drawing data, and transmits the drawing data to the display 110 to display it. The respective blocks in the PC 100 are mutually connected via an internal bus 109. The arrangement of the PC 100 is not limited to the arrangement shown in FIG. 2, and the PC 100 has an arrangement, as needed, corresponding to functions that a device applied as the PC 100 can execute.

Next, the hardware arrangement of the mobile terminal 200 will be described. The mobile terminal 200 mainly has functions of an information processing apparatus such as a tablet computer or a smartphone, and includes a touch panel used for both display and an input I/F. A CPU 201 is a central processing unit, and comprehensively controls the mobile terminal 200. A ROM 202 is a nonvolatile storage, and holds various kinds of data and programs. For example, a basic program and various kinds of application programs are stored in the ROM 202. A RAM 203 is a volatile storage, and temporarily holds programs and data. An external storage apparatus 204 is a nonvolatile storage such as a Hard Disk Drive (HDD) or a Solid State Drive (SSD), and holds programs and data. The external storage apparatus 204 may be configured to be externally attached. The CPU 201 executes various kinds of processes based on the programs and data stored in the ROM 202, the RAM 203, and the external storage apparatus 204. For example, the operation of the mobile terminal 200 in this embodiment is implemented when the CPU 201 reads out the program stored in the ROM 202 into the RAM 203 and executes the program.

A data communication I/F 205 executes data communication with external equipment. As the data communication method, for example, a wired connection method such as a USB, IEEE 1394, or a LAN, or a wireless connection method such as Bluetooth or WiFi is used. An input device control unit 206 acquires information concerning a user operation accepted via an input apparatus 207, and transmits the information to the CPU 201. The input apparatus 207 is, for example, an apparatus that can accept an input operation on a screen such as a touch panel having a display function and an input function, which is included in a tablet computer or a smartphone. A display apparatus control unit 208 converts screen data for the user interface screen or the like into drawing data, and causes a display apparatus 209 to display the drawing data. The respective blocks in the mobile terminal 200 are mutually connected via an internal bus 210. The arrangement of the mobile terminal 200 is not limited to the arrangement shown in FIG. 2, and the mobile terminal 200 has an arrangement, as needed, corresponding to functions that a device applied as the mobile terminal 200 can execute.

Next, the hardware arrangement of the server 300 will be described. A CPU 301 is a central processing unit, and comprehensively controls the server 300. A ROM 302 is a nonvolatile storage, and holds various kinds of table data and programs. For example, a basic program and various kinds of application programs are stored in the ROM 302. The application programs include, for example, a print application that the user can download. A RAM 303 is a volatile storage, and temporarily holds programs and data. An external storage apparatus 304 is a nonvolatile storage such as a Hard Disk Drive (HDD) or a Solid State Drive (SSD), and holds programs and data. For example, the operation of the server 300 in this embodiment is implemented when the CPU 301 reads out the program stored in the ROM 302 into the RAM 303 and executes the program.

A data communication OF 305 executes data communication with external equipment. For example, the data communication I/F 305 controls, via the router 120, data transmission/reception with the PC 100 and the printer 400. As the data communication method, for example, a wired connection method such as a USB, IEEE 1394, or a LAN, or a wireless connection method such as Bluetooth or WiFi is used. The respective blocks in the server 300 are mutually connected via an internal bus 306. The arrangement of the server 300 is not limited to the arrangement shown in FIG. 2, and the server 300 has an arrangement, as needed, corresponding to functions that a device applied as the server 300 can execute.

Next, the hardware arrangement of the printer 400 will be described. A data communication I/F 401 executes data communication with external equipment. For example, the data communication I/F 401 controls, via the router 120, data transmission/reception with the PC 100 and the server 300. As the data communication method, for example, a wired connection method such as a USB, IEEE 1394, or a LAN, or a wireless connection method such as Bluetooth or WiFi is used.

The printer 400 can receive print data generated by the PC 100, the mobile terminal 200, and the server 300, and print the data on print media. Note that the print data includes image data to be printed, and print setting data defining a print setting. A printer controller 402 controls a printer engine 403 based on the print data received from the external equipment.

For example, the printer controller 402 performs, on the image data, color space conversion and color separation processing into color materials corresponding to the sheet type defined by the print setting data, thereby generating the print data that the printer engine 403 can process. The printer controller 402 also performs image processing such as output tone correction or halftoning using an image processing parameter such as a lookup table.

The printer engine 403 converts the image data of the print data into ink color data for each ink used in the printer 400, and executes a printing process. Note that the printer engine 403 has the arrangement corresponding to the printing method of the printer 400. For example, in this embodiment, the printer 400 is assumed to be an inkjet printer that executes printing on a print medium by an inkjet printing method. In this case, the printer engine 403 is formed while including ink tanks storing respective inks, and a printhead provided with a nozzle array for discharging ink droplets. In the printing process, based on the print data, the heating operation or the like of the heater mounted on the printhead is controlled to control nozzles so as to discharge ink droplets.

The arrangement of the printer 400 is not limited to the arrangement shown in FIG. 2, and the printer 400 has an arrangement, as needed, corresponding to functions that a device applied as the printer 400 can execute. Further, the printer 400 is not limited to a printer using the inkjet printing method, and may be a printer using another printing method such as an electrophotographic method. The printer 400 may be a MultiFunctional Peripheral (MFP) that integrates the functions of a scanner, a facsimile, and the like.

Figure 3:
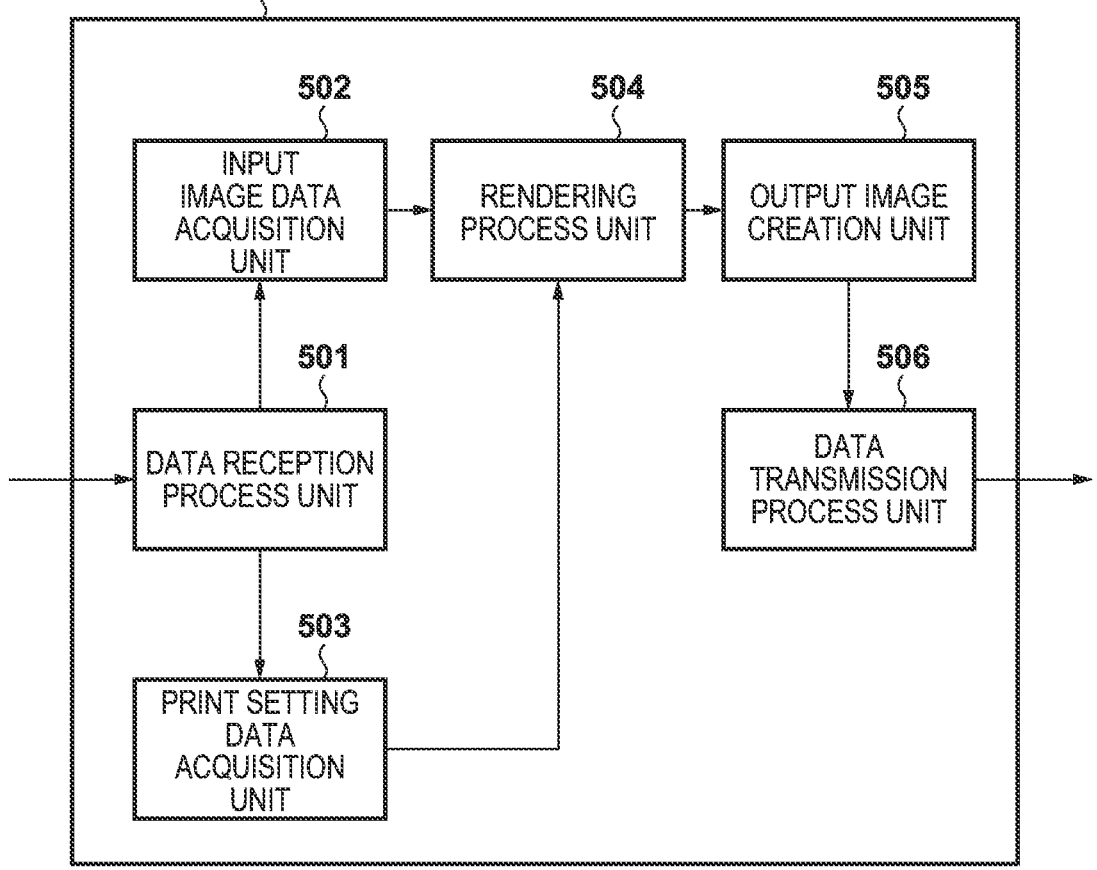
FIG. 3 is a view showing the software arrangement of a server.

FIG. 3 is a view showing an example of the software arrangement of the server 300. FIG. 3 mainly shows the arrangement concerning a rendering process and a process of generating print image data. As has been described above, the server 300 is, for example, a Web server that provides a Web application by which the user can create/edit content data (for example, poster image data) to be printed. In this case, the software of the server 300 is formed while including a frontend that controls display of the Web browser on the PC 100 or the like, and a backend that includes the arrangement shown in FIG. 3. The frontend manages/holds a program (JavaScript) to be executed on the Web browser. For example, when the program is transmitted (downloaded) to the PC 100, the Web browser on the PC 100 performs corresponding display. The frontend includes, for example, a program for performing user authentication, a program for performing content creation/edition processing, and a program for the arrangement shown in FIG. 4. Note that in a state in which the program of the frontend has been downloaded on the PC 100, this program becomes a part of the software arrangement of the PC 100.

In this embodiment, as an example, the configuration is assumed in which the user creates/edits a content such as a poster by the frontend on the PC 100 side, and the backend on the server 300 side executes a rendering process. Note that a printer driver corresponding to the printer 400 has been installed on the PC 100. When a print instruction is accepted from the user, the frontend instructs the backend to execute printing based on the print setting for the printer driver, and transmits the content data created/edited by the user to the backend. The backend performs a rendering process on the transmitted content data, and transmits it to the PC 100. The content data having undergone the rendering process is printed by the printer corresponding to the printer driver.

The arrangement described below shows an example of the arrangement included in the above-described program of the backend. As shown in FIG. 3, the server 300 includes a data reception process unit 501, an input image data acquisition unit 502, a print setting data acquisition unit 503, a rendering process unit 504, an output image creation unit 505, and a data transmission process unit 506.

The data reception process unit 501 receives, from the PC 100 or the mobile terminal 200, data concerning generation of print image data. The data concerning generation of print image data is, for example, data transmitted from the frontend, and includes the input image data created/edited by the user, the print setting data, the information of the transmission destination printer, and the like.

The input image data acquisition unit 502 acquires input image data D1 from the data received by the data reception process unit 501. Note that the input image data D1 to be acquired may be so-called bitmap image data that has undergone data compression such as JPEG (Joint Photographic Experts Group) and converted into an image file. The input image data D1 may be vector image data such as an SVG (Scalable Vector Graphics) file. That is, the input image data D1 is only required to be data that can be converted into data processable by the rendering process unit 504.

The print setting data acquisition unit 503 acquires print setting data D2 from the data received by the data reception process unit 501. The print setting data includes, for example, pieces of information such as the model and sheet feeding method of the printer, the sheet size, the sheet type, the print quality, the designation of the border, the designation of double-sided printing and the binding direction, the sheet orientation, the output image size calculated from various kinds of print settings, and the like.

The rendering process unit 504 acquires the input image data D1 acquired by the input image data acquisition unit 502, and the print setting data D2 acquired by the print setting data acquisition unit 503. Then, based on the input image data D1 and the print setting data D2, the rendering process unit 504 creates print image data D3 used for printing by the printer 400. In the rendering process unit 504, a print region image size P1 is calculated from the input image data D1 and the print setting data D2 as described below.

For example, assume that the size (width×height) of the input image data D1 is 3000×4000 pixels. Further, assume that "sheet size of A4" and "bordered printing" are set in the print setting data D2, and the size (width×height) of a printable region P2 in this case is 4500×6800 pixels. The size of the printable region P2 may be decided from a combination of the contents of the print settings, or may be decided based on the information received from the printer 400. Then, the rendering process unit 504 calculates the enlarged or reduced size so that the input image data D1 fits within the printable region P2. At this time, the size that fits within the size of the printable region P2 is calculated so as not to change the ratio (aspect ratio) of the width and height of the input image data D1. In this example, the size of the input image data D1 is 3000×4000 pixels, and the size of the printable region P2 is 4500×6800 pixels. Accordingly, the print region image size P1 (width×height) that fits within the size of the printable region P2 is of 4500×6000 pixels.

The size of the printable region P2 can change in accordance with the model of the printer. The size of the printable region P2 can also change in accordance with the feed paper supportable by the printer, such as cut paper or roll paper. The size of the printable region P2 can also change in accordance with the sheet size. The size of the printable region P2 can also change in accordance with the sheet type, for example, high quality paper or low quality paper such as plain paper. The size of the printable region P2 can also change in accordance with the print quality such as the high quality or the low quality. The size of the printable region P2 can also change in accordance with the border setting such as bordered printing or borderless printing. The rendering process unit 504 generates the print image data D3 by enlarging or reducing the input image data D1 so as to correspond to the print region image size P1.

The output image creation unit 505 converts the print image data D3 generated by the rendering process unit 504 into an image file. The output image creation unit 505 converts the print image data D3 into an image file in a compression format such as JPEG or PNG. Various methods may be used for conversion into an image file. The data transmission process unit 506 transmits the image file generated by the output image creation unit 505 to an external apparatus such as the PC 100.

Figure 4:
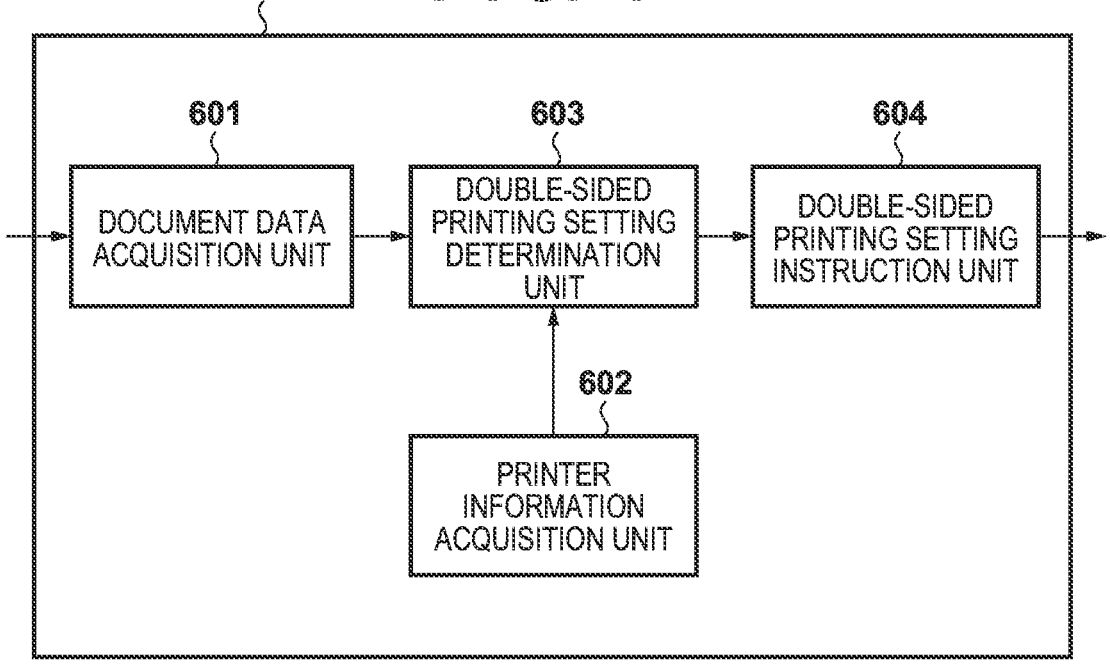
FIG. 4 is a view showing the software arrangement of a PC.

FIG. 4 is a view showing an example of the software arrangement of the PC 100. The arrangement in FIG. 4 shows, for example, the arrangement for processing of the program in the frontend of the Web application upon accepting a print instruction from the user. Hereinafter, the software including the arrangement shown in FIG. 4 will be simply referred to as the "application".

As shown in FIG. 4, the application includes a document data acquisition unit 601, a printer information acquisition unit 602, a double-sided printing setting determination unit 603, and a double-sided printing setting instruction unit 604. The document data acquisition unit 601 acquires, by the Web browser or dedicated application, document data D4 including the input image data to be printed, the size of the input image data, category information indicating the type of the input image data, information indicating whether to execute double-sided printing, and the like. The document data D4 is, for example, data designated (selected) by the user on the user interface screen of the application.

The printer information acquisition unit 602 acquires printer information D5 including the model information and print setting information of the printer that executes printing. The printer information acquisition unit 602 transmits the acquired printer information D5 to the double-sided printing setting determination unit 603.

The double-sided printing setting determination unit 603 acquires the document data D4 acquired by the document data acquisition unit 601, and the printer information D5 acquired by the printer information acquisition unit 602. Based on the acquired document data D4 and printer information D5, the double-sided printing setting determination unit 603 determines the binding direction setting of the double-sided printing setting in a case of executing double-sided printing. Then, the double-sided printing setting determination unit 603 transmits, to the double-sided printing setting instruction unit 604, the determination result as a determination result D6.

The double-sided printing setting instruction unit 604 receives the determination result D6 from the double-sided printing setting determination unit 603, and performs a double-sided printing setting for the printer driver. In this embodiment, the double-sided printing setting instruction unit 604 sets, as the double-sided printing setting, the double-sided printing ON/OFF information, and long-side binding/short-side binding as the binding direction. That is, in this embodiment, setting of long-side binding/short-side binding for the printer driver is automatically performed by the application without intervening a user operation.

Figure 5:
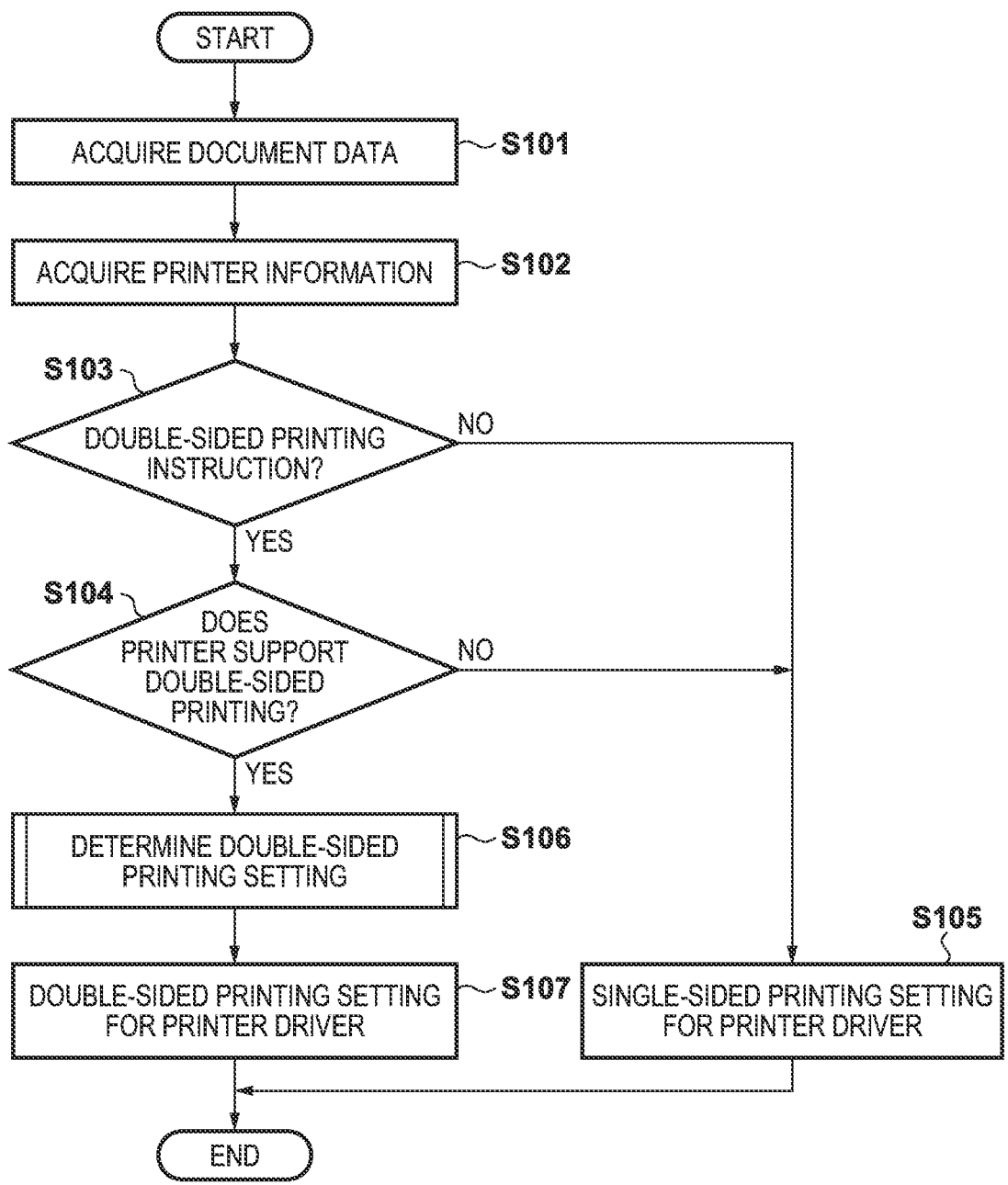
FIG. 5 is a flowchart illustrating a process of performing a double-sided printing setting for a printer driver.

FIG. 5 is a flowchart illustrating a process of performing a double-sided printing setting for the printer driver. The process illustrated in FIG. 5 is implemented when, for example, the CPU 101 reads out an application program stored in the ROM 102 into the RAM 103 and executes it. The process illustrated in FIG. 5 is started, for example, when a print instruction of the image data created/edited by the user on the user interface screen of the application is accepted.

In step S101, the CPU 101 acquires the document data D4 by the document data acquisition unit 601 shown in FIG. 4. Here, the document data D4 includes the input image data to be printed, the size of the input image data, category information indicating the type of the input image data, information indicating whether to execute double-sided printing, and the like, which are acquired by the Web browser or dedicated application.

The input image data may be photographic image data obtained by capturing an image by an image capturing apparatus. The input image data may be data selected by the user on the user interface screen of the application. The input image data may be image data obtained by, for example, editing an image by software, or vector data of HTML/CSS or SVG that can be displayed by the Web browser. The input image data may be data in another format as long as it can be converted into data processable by the rendering process unit 504. The size of the input image data indicates, for example, the document size expressed by the vertical and horizontal sizes, or the aspect ratio data.

The category information indicating the type of the input image data is information indicating, for example, the type of poster, a wall calendar, a desk calendar, or the like, which is information associated with the layout information of images on the obverse surface and the reverse surface in double-sided printing. For example, in a case of a wall calendar, it is recommended that the relationship between the top portion and the bottom portion (top-to-bottom orientation) of the image with respect to the side where binding is set is reversed between the obverse surface and the reverse surface. Accordingly, if the category information indicates "wall calendar", the layout information is associated in advance, which designates the image layout in which the relationship between the top portion and the bottom portion of the image with respect to the side where binding is set is reversed between the obverse surface and the reverse surface. In this embodiment, it will be described assuming that the category information included in the document data D4 is associated with the layout information, in advance, which designates the image layout in which the relationship between the top portion and the bottom portion of the image with respect to the side where binding is set is the same between the obverse surface and the reverse surface. The information indicating whether to execute double-sided printing will be described later.

In step S102, the CPU 101 acquires the printer information D5 by the printer information acquisition unit 602 shown in FIG. 4. In step S102, the CPU 101 acquires the printer information D5 from the printer driver, of the printer drivers installed on the PC 100, corresponding to the printer designated by the user or set by default. The printer information D5 is information indicating the capability of the printer, and includes pieces of information such as the model and sheet feeding information of the printer, the sheet size and sheet type supported by the printer, the kind of executable print quality, the property of margin setting, the property of double-sided printing setting, and the property of binding direction setting.

If the selected printer is a double-sided printing compatible printer, the user can select whether to perform the double-sided printing setting. If the double-sided printing setting can be performed, the binding direction setting can be performed as the function of the double-sided printing setting. The binding direction setting is for setting, when printing a plurality of copies, whether to set binding on a long side of the paper sheet or set binding on a short side thereof. In this embodiment, the printer information D5 includes the information as to the property of the double-sided printing setting, and information as to the property of binding direction setting.

In step S103, the CPU 101 determines, by the double-sided printing setting determination unit 603 shown in FIG. 4, whether the document data D4 acquired in step S101 is the target of double-sided printing. The determination in step S103 is performed based on the information, included in the document data D4, indicating whether to execute double-sided printing.

The information included in the document data D4 and indicating whether to execute double-sided printing is data included in the document data D4 as option data in addition to the input image data and indicating ON/OFF of double-sided printing. Such data may be, for example, generated from the print setting set on the user interface screen of the application, and added to the document data D4. If double-sided printing is set to ON, the CPU 101 may determine in step S103 that the input image data is the target of double-sided printing. Further, if pieces of the input image data for two pages have settings as the obverse surface and the reverse surface, the CPU 101 may determine that the input image data is the target of double-sided printing. That is, if the information that can be used to determine whether to execute double-sided printing is included in the document data D4, the CPU 101 may determine, using this information, that the input image data is the target of double-sided printing. If it is determined in step S103 that the input image data is the target of double-sided printing, the process advances to step S104. On the other hand, it is determined that the input image data is not the target of double-sided printing, the process advances to step S105.

In step S104, based on the printer information D5 acquired in step S102, the CPU 101 determines, by the double-sided printing setting determination unit 603 shown in FIG. 4, whether the printer indicated by the printer information D5 is a double-sided printing compatible printer.

The printer information D5 includes information indicating the property of the double-sided printing setting and the property of the binding direction setting. The double-sided printing setting and the binding direction setting are included in the print setting for the printer driver corresponding to the printer designated by the user or set by default. In step S104, if the printer information D5 indicates that the double-sided printing setting and the binding direction setting can be performed, the CPU 101 determines that the printer indicated by the printer information D5 is a double-sided printing compatible printer, and the process advances to step S106. On the other hand, if the printer information D5 indicates that the double-sided printing setting cannot be performed, or indicates that the double-sided printing setting and the binding direction setting cannot be performed, the CPU 101 determines that the printer indicated by the printer information D5 is not a double-sided printing compatible printer, and the process advances to step S105.

If it is determined in step S103 that the input image data is not the target of double-sided printing, or if it is determined in step S104 that the printer indicated by the printer information D5 is not a double-sided printing compatible printer, the process advances to step S105. In step S105, the CPU 101 performs not the double-sided printing setting but the single-sided printing setting for the printer driver. For example, if it is determined in step S103 that the input image data is not the target of double-sided printing and the printer information D5 indicates that the double-sided printing setting and the binding direction setting can be performed, the CPU 101 sets the double-sided printing to OFF (inactive), and performs the single-sided printing setting for the printer driver. After step S105, the process of FIG. 5 ends.

In step S106, based on the document data D4 acquired in step S101 and the printer information D5 acquired in step S102, the CPU 101 executes, by the double-sided printing setting determination unit 603 shown in FIG. 4, a binding determination process to be described later with reference to FIG. 7. In this embodiment, the application is assumed to be a print application that executes printing of a poster image. The document data as the target of the binding setting in double-sided printing is assumed to be poster image data of a category for which it is recommended that the relationship between the top portion and the bottom portion of the image with respect to the side where binding is set is the same between the obverse surface and the reverse surface.

Figure 6:
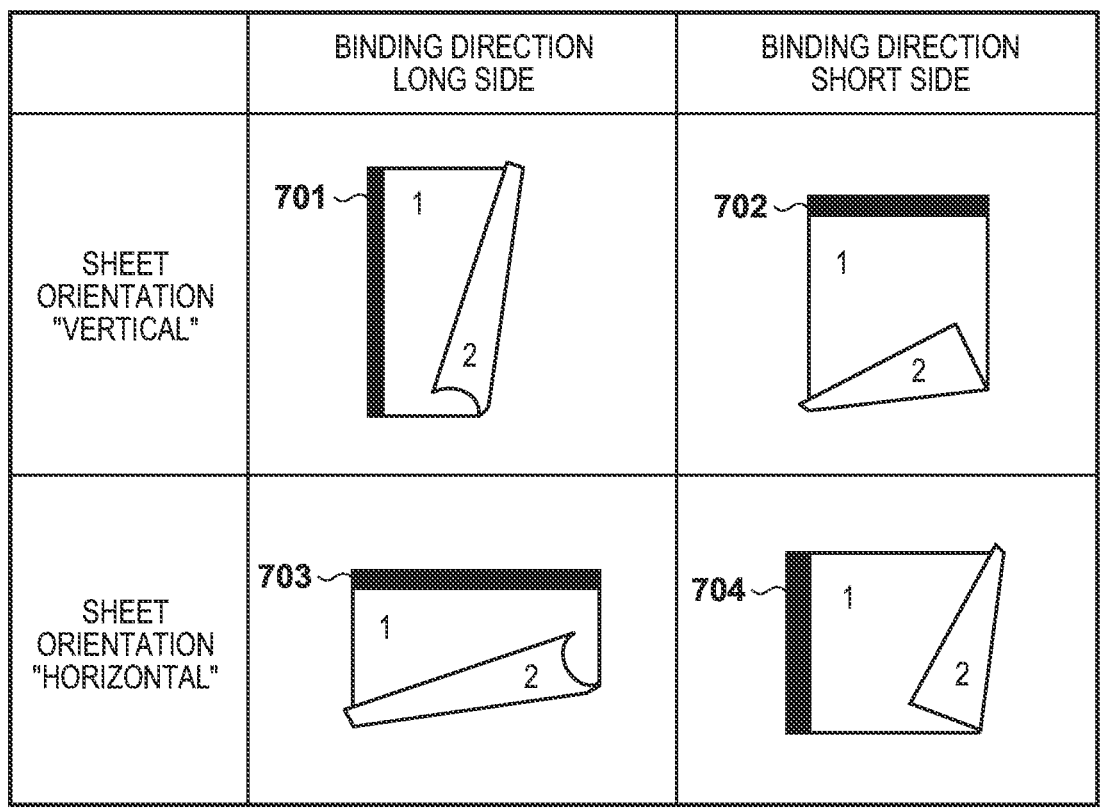
FIG. 6 is a view for explaining the relationship between the sheet orientation and the binding direction.

FIG. 6 is a view for explaining the relationship between the sheet orientation and the binding direction in a case of executing double-sided printing. In this embodiment, the image layout on the obverse surface and that on the reverse surface are defined in advance as shown in FIG. 6 in accordance with the binding direction in double-sided printing. FIG. 6 shows the print result depending on the sheet orientation and the binding direction. For example, assume a case in which the document data D4 acquired by the document data acquisition unit 601 has the vertically long document size, and is printed with the setting of "portrait sheet orientation". In this case, if printing is executed with the binding direction setting of "long-side binding", the image is arranged (laid out) in the print region of the print medium on the obverse surface and the reverse surface so as to be aligned with the long side of the paper sheet, like a print result 701. If printing is executed with the binding direction setting of "short-side binding", the image is arranged on the obverse surface and the reverse surface so as to be aligned with the vertically long side of the paper sheet, like a print result 702.

That is, in the print result 701, printing is executed such that the relationship between the top portion and the bottom portion of the image with respect to the side where binding is set is the same between the obverse surface and the reverse surface. On the other hand, in the print result 702, printing is executed such that the relationship between the top portion and the bottom portion of the image with respect to the side where binding is set is reversed between the obverse surface and the reverse surface. The print result 702 is a print result which is not recommended for the category of the document data D4 handled in this embodiment.

Further, for example, assume a case in which the document data D4 acquired by the document data acquisition unit 601 has the horizontally long document size, and is printed with the setting of "landscape sheet orientation". In this case, if printing is executed with the binding direction setting of "long-side binding", the image is arranged in the print region of the print medium on the obverse surface and the reverse surface so as to be aligned with the long side of the paper sheet, like a print result 703. If printing is executed with the binding direction setting of "short-side binding", the image is arranged on the obverse surface and the reverse surface so as to be aligned with the short side of the paper sheet, like a print result 704.

That is, in the print result 704, printing is executed such that the relationship between the top portion and the bottom portion of the image with respect to the side where binding is set is the same between the obverse surface and the reverse surface. On the other hand, in the print result 703, printing is executed such that the relationship between the top portion and the bottom portion of the image with respect to the side where binding is set is reversed between the obverse surface and the reverse surface. The print result 703 is a print result which is not recommended for the category of the document data D4 handled in this embodiment. In this manner, depending on the sheet orientation and the binding direction, different results of double-sided printing are obtained. If the user sets the sheet orientation and the binding direction for the printer driver, it is necessary to perform the setting while checking in preview whether the layout state of the document data on the obverse surface and the reverse surface is in the recommended state. In this embodiment, since the application performs the appropriate binding setting in accordance with the category of the document data so that the recommended layout state is obtained, the convenience can be improved.

Figure 7:
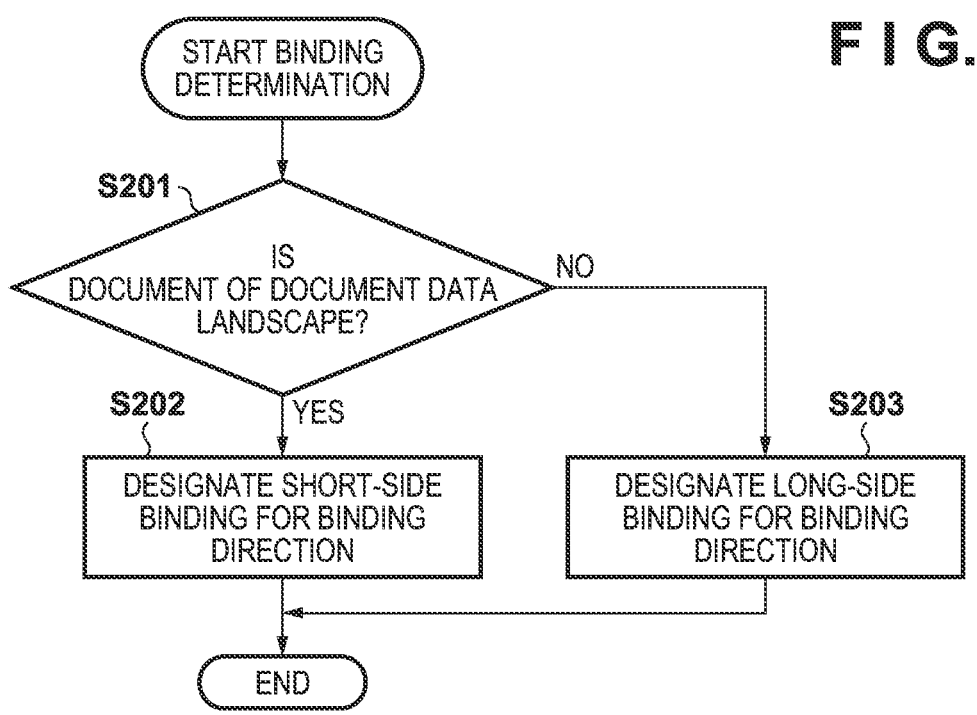
FIG. 7 is a flowchart illustrating a binding determination process in step S106.

FIG. 7 is a flowchart illustrating the binding determination process in step S106. In step S201, the CPU 101 determines, based on the document data D4 acquired in step S101, whether the document of the input image data included in the document data D4 is for portrait. The determination in step S201 is performed based on, for example, the size of the input image data included in the document data D4. If it is determined that the document of the input image data is for landscape, in step S202, the CPU 101 designates "short-side binding" as the binding direction to be set for the printer driver. Then, the process of FIG. 7 is terminated, and the process advances to step S107. Note that at this time, if the binding setting has been already set in the application and this binding setting is different from the contents designated in step S202, the binding setting in the application is changed to the contents designated in step S202.

On the other hand, if it is determined that the document of the input image data is not for landscape but for, for example, portrait, in step S203, the CPU 101 designates "long-side binding" as the binding direction to be set for the printer driver. Then, the process of FIG. 7 is terminated, and the process advances to step S107. Note that at this time, if the binding setting has been already set in the application and this binding setting is different from the contents designated in step S203, the binding setting in the application is changed to the contents designated in step S203.

By the process of FIG. 7, if it is determined that the document of the input image data is for portrait, the image layout is controlled such that the relationship between the top portion and the bottom portion of the image with respect to the side where binding is set is the same between the obverse surface and the reverse surface, like the print result 701 shown in FIG. 6. If it is determined that the document of the input image data is for landscape, the image layout is controlled such that the relationship between the top portion and the bottom portion of the image with respect to the side where binding is set is the same between the obverse surface and the reverse surface, like the print result 704 shown in FIG. 6.

In step S107, based on the determination result in step S106, the CPU 101 performs, by the double-sided printing setting instruction unit 604 shown in FIG. 4, the double-sided printing setting for the printer driver corresponding to the selected printer. After step S107, the process of FIG. 5 is terminated.

In step S107, the CPU 101 sets the sheet orientation and the binding direction for the printer driver without intervening a user operation. That is, if the document of the input image data is for portrait, "portrait" is set as the sheet orientation, and "long-side binding" is set as the binding direction. On the other hand, if the document of the input image data is for landscape, "landscape" is set as the sheet orientation, and "short-side binding" is set as the binding direction.

As has been described above, in this embodiment, when executing double-sided printing, the sheet orientation and the binding direction can be set for the printer driver without intervening a user operation. For example, in a case in which the document is a poster and it is recommended to execute printing such that the relationship between the top portion and the bottom portion of the document image with respect to the side where binding is set is the same between the obverse surface and the reverse surface, it is possible to improve the convenience in setting of the printer driver as has been described above. With the configuration as described above, it is possible to prevent a situation in which unrecommended double-sided printing is executed, resulting in a print failure.

Second Embodiment

Points of the second embodiment different from the first embodiment will be described below. In the first embodiment, it has been described that when the document is a poster, the double-sided printing setting for the printer driver is automatically performed without intervening a user operation, such that the relationship between the top portion and the bottom portion of the document image with respect to the side where binding is set is the same between the obverse surface and the reverse surface. In this embodiment, a configuration will be described in which, even when executing double-sided printing in a case in which various categories of documents are assumed to exist, setting of the sheet orientation and the binding direction is performed for the printer driver without intervening a user operation.

Figure 8:
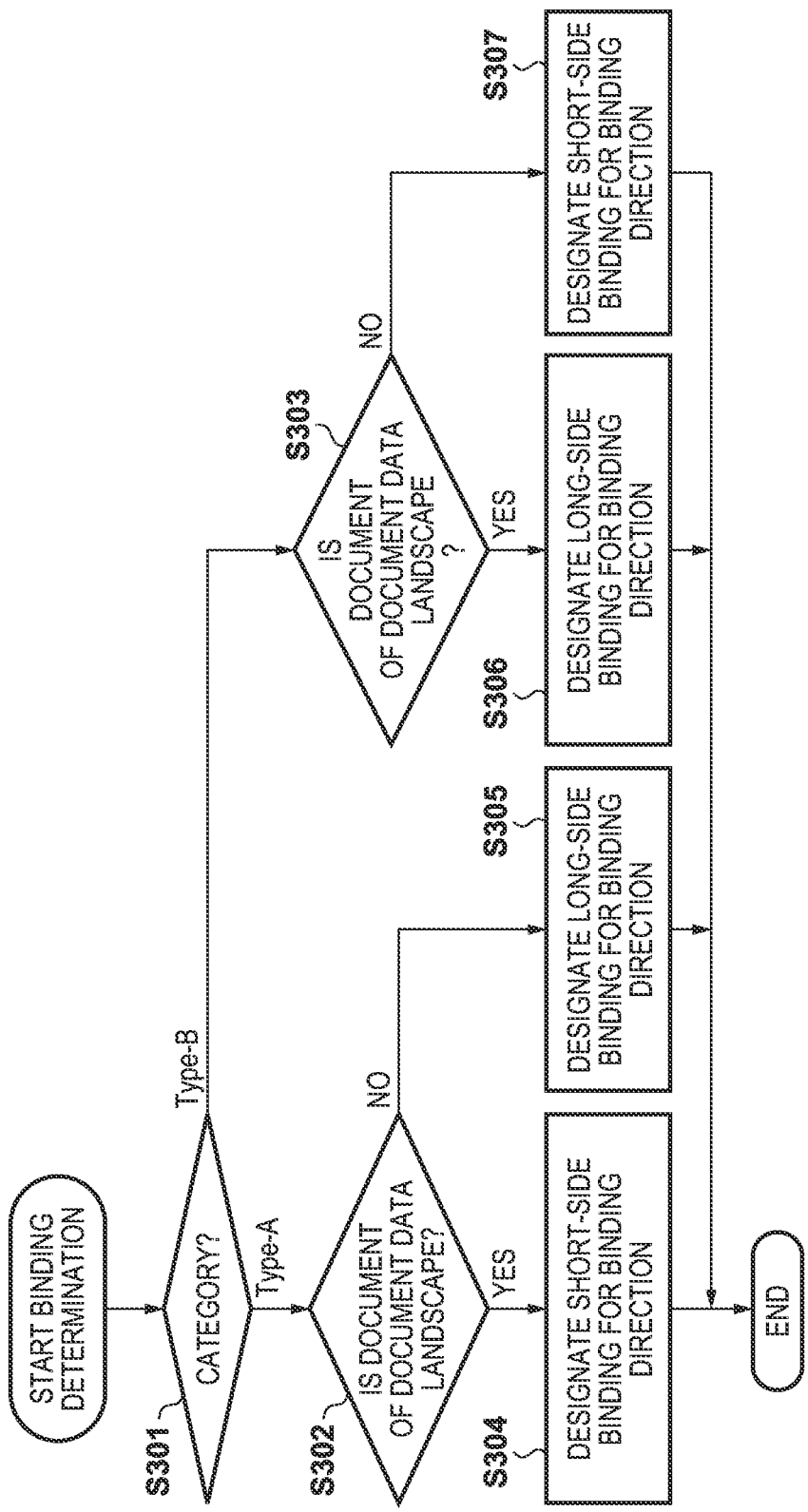
FIG. 8 is a flowchart illustrating a binding determination process in step S106.

FIG. 8 is a flowchart illustrating the binding determination process in step S106 in this embodiment. The process illustrated in FIG. 8 is implemented when, for example, a CPU 101 reads out an application program stored in a ROM 102 into a RAM 103 and executes it. In step S301, based on document data D4 acquired in step S101, the CPU 101 determines the category of the document data D4.

In the first embodiment, the input image data of a category for which it is recommended that the relationship between the top portion and the bottom portion of the image with respect to the side where binding is set is the same between the obverse surface and the reverse surface has been described. In this embodiment, this category is defined as Type A. In this embodiment, it is assumed that there is another category. For example, assume that there is a category for which it is recommended that the relationship between the top portion and the bottom portion of the image with respect to the side where binding is set is reversed between the obverse surface and the reverse surface, like a wall calendar. This category is defined as Type B. In this embodiment, in step S301, based on the category information included in the document data D4, the CPU 101 acquires, by a document data acquisition unit 601 shown in FIG. 4, the information as to whether the category is Type A or Type B.

If it is determined in step S301 that the category of the document data D4 acquired by the document data acquisition unit 601 is Type A, the process advances to step S302. On the other hand, if it is determined that the category of the document data D4 acquired by the document data acquisition unit 601 is Type B, the process advances to step S303.

In step S302, as in step S201, the CPU 101 determines, based on the document data D4 acquired in step S301, whether the document of the input image data included in the document data D4 is for landscape. If it is determined that the document of the input image data is for landscape, in step S304, the CPU 101 designates "short-side binding" as the binding direction to be set for the printer driver, as in step S202. Then, the process advances to step S107 of FIG. 5 and, as the print setting for the printer driver, "landscape" is set as the sheet orientation and "short-side binding" is set as the binding direction. On the other hand, if it is determined that the document of the input image data is not for landscape but for, for example, portrait, in step S305, the CPU 101 designates "long-side binding" as the binding direction for the printer driver, as in step S203. Then, the process advances to step S107 of FIG. 5 and, as the print setting for the printer driver, "portrait" is set as the sheet orientation and "long-side binding" is set as the binding direction.

If it is determined in step S301 that the category of the document data D4 is Type B, the CPU 101 determines in step S303 whether the document of the input image data is for landscape, as in step S201. If it is determined that the document of the input image data is for landscape, in step S306, the CPU 101 designates "long-side binding" as the binding direction to be set for the printer driver. Then, the process advances to step S107 of FIG. 5 and, as the print setting for the printer driver, "landscape" is set and the sheet orientation and "long-side binding" is set as the binding direction. On the other hand, if it is determined that the document of the input image data is not for landscape but for, for example, portrait, in step S307, the CPU 101 designates "short-side binding" as the binding direction to be set for the printer driver. Then, the process advances to step S107 of FIG. 5 and, as the print setting for the printer driver, "portrait" is set as the sheet orientation and "short-side binding" is set as the binding direction.

With the process of FIG. 8, in a case in which the category of the document data D4 is Type A, if it is determined that the document of the input image data is for portrait, printing is executed such that the relationship between the top portion and the bottom portion of the image with respect to the side where binding is set is the same between the obverse surface and the reverse surface, like the print result 701 in FIG. 6. If it is determined that the document of the input image data is for landscape, printing is executed such that the relationship between the top portion and the bottom portion of the image with respect to the side where binding is set is the same between the obverse surface and the reverse surface, like the print result 704 in FIG. 6.

In a case in which the category of the document data D4 is Type B, if it is determined that the document of the document data D4 is for portrait, printing is executed such that the relationship between the top portion and the bottom portion of the image with respect to the side where binding is set is reversed between the obverse surface and the reverse surface, like the print result 702 in FIG. 6. If it is determined that the document of the document data D4 is for landscape, printing is executed such that the relationship between the top portion and the bottom portion of the image with respect to the side where binding is set is reversed between the obverse surface and the reverse surface, like the print result 703 in FIG. 6.

As has been described above, in this embodiment, even in the case in which there are various categories of document data, when executing double-sided printing, setting of the sheet orientation and the binding direction can be performed for the printer driver without intervening a user operation. As a result, for the category for which it is recommended to execute printing such that the relationship between the top portion and the bottom portion of the image with respect to the side where binding is set is the same between the obverse surface and the reverse surface, such the double-sided printing setting can be performed for the printer driver without intervening a user operation. For the category for which it is recommended to execute printing such that the relationship between the top portion and the bottom portion of the image with respect to the side where binding is set is reversed between the obverse surface and the reverse surface, such the double-sided printing setting can be performed for the printer driver without intervening a user operation. With the configuration as described above, it is possible to prevent a situation in which unrecommended double-sided printing is executed, resulting in a print failure.

In each embodiment described above, as has been described in the examples of software arrangements shown in FIGS. 3 and 4, the print application is assumed to have the arrangement of the Web application in which the rendering process is executed by the backend on the server 300 side. However, the print application is not limited to such the arrangement. The print application may be a native application program (to be referred to as a native application hereinafter) downloaded and installed on the PC 100. For example, the process including the rendering process described with reference FIG. 3 may be included in the native application of the PC 100. In this case, in the native application running on the PC 100, the user may select the document data D4 received by the document data acquisition unit 601 shown in FIG. 4.

For example, the user may select the input image data for double-sided printing on the user interface screen displayed on the display 110. For example, all source codes of the native application including the arrangements shown in FIGS. 3 and 4 are saved in the ROM 102 of the PC 100. In addition, a plurality of document data D4 are saved in the external storage apparatus 104. Then, the native application displays, on the display 110, the user interface screen on which the user can select the input image data. At this time, the user selection is performed via the mouse and keyboard of the input apparatus 107. The input device control unit 106 temporarily stores, in the RAM 103, the input image data selected via the user interface screen displayed on the display apparatus 110. The CPU 101 converts the input image data temporarily stored in the RAM 103 into drawing data displayable on the display apparatus 110, thereby performing preview display. In preview display, the user may be able to select the input image data for both the obverse surface and the reverse surface. At this time, if the obverse surface and the reverse surface are selected as the print targets, the CPU 101 may determine that the input image data is the target of double-sided printing. Alternatively, a predetermined checkbox may be provided on the user interface screen, and if the checkbox is checked, the CPU 101 may determine that the input image data is the target of double-sided printing.

The input image data may be determined to be the target of double-sided printing by another configuration. Even when the print application is configured as the native application, the printer registered on the PC 100 may be selectable on the user interface screen of the native application. If the selected printer is determined to be a double-sided printing compatible printer, and the input image data is determined to be the target of double-sided printing, a double-sided printing setting is performed for the printer driver without intervening a user operation, as in the respective embodiments.

The print application may be a hybrid application formed by cooperation of the Web application and the native application. The Web application portion is created in a development language that can be used on any OS such as Windows OS and Mac OS. For the native application portion, a source code is created for each OS. For example, the user interface portion operated by the user is created by the Web application using HTML, CSS, JavaScript, or the like, and the print process portion is created by the native application using C/C++ language or the like so as to be specialized to each OS. Even when the print application is configured as a hybrid application, operations similar to those of each embodiment are implemented. That is, if the selected printer is determined to be a double-sided printing compatible printer, and the input image data is determined to be the target of double-sided printing, a double-sided printing setting is performed for the printer driver without intervening a user operation.

In the respective embodiments, the configuration of selecting the document data D4 on the PC 100 is assumed, but the present disclosure is not limited to this configuration. For example, the document data D4 can be selected on the mobile terminal 200, and a poster editing operation or the like may be accepted for the document data D4 selected by the user. Further, the mobile terminal 200 may be connected to the server 300, and the selected document data D4 may be transmitted to the PC 100. Alternatively, the mobile terminal 200 may be configured to have a function capable of instructing a printing setting for the printer driver, and the operation of the PC 100 in each embodiment may be implemented by the mobile terminal 200.

In the respective embodiments, it has been described that, based on whether the document of the input image data included in the document data D4 is for landscape, the binding direction in the double-sided printing setting is set for the printer driver without intervening a user operation. Here, the user may be able to designate the operation mode as to whether setting is performed without intervening a user operation. For example, a menu button may be prepared on the user interface screen of the print application, and a button for switching ON/OFF of automatic setting of double-sided printing may be prepared in the menu. If automatic setting of double-sided printing is set to ON, the double-sided printing setting is performed for the printer driver without intervening a user operation, as has been described in the respective embodiments. On the other hand, if automatic setting of double-sided printing is set to OFF, the operations described in the respective embodiments are not executed, and the double-sided printing setting is performed for the printer driver in accordance with a user operation. A dialogue prompting the user to select the operation mode as to whether the double-sided printing setting is performed for the printer driver without intervening a user operation may be displayed when the print application is activated. The binding direction set for the printer driver may be changed by the user on the printer driver.

In the respective embodiments, it has been described that it is determined in step S201 of FIG. 7 whether the document of the input image data is for landscape. That is, since the determination is based on whether the document of the input image data is for landscape, if the image is square, the process is performed as in the case of determination that the image is for portrait. More specifically, for example, like the print result 701, binding is set for the left side with respect to the image normal position, and images are arranged such that the relationship between the top portion and the bottom portion of the image is the same between the obverse surface and the reverse surface. However, another process may be performed if the document is square. For example, if the document is square, a case is assumed in which it is recommended that the relationship between the top portion and the bottom portion of the image with respect to the side where binding is set is reversed between the obverse surface and the reverse surface, as in the category for desktop calendar.

In order to be able to cope with such the case, the document data D4 may include a determination condition for the case in which the document of the input image data is square. That is, the document data D4 may include information as to which one of the process for Type A and the process for Type B shown in FIG. 8 is performed if the document is square. Alternatively, a menu button may be prepared on the user interface screen of the print application, and the user may be able to select the determination condition in a case of the square document. For example, the document data D4 includes information designating to perform the processing for portrait in Type B if the document is square. In this case, the processing in step S307 is performed. As a result, by the setting for the printer driver, it is possible to execute printing while arranging the images such that the relationship between the top portion and the bottom portion of the image with respect to the side where binding is set is reversed between the obverse surface and the reverse surface, like the print result 702, in accordance with the category.

In the respective embodiments, the binding direction to be set for the printer driver is decided based on the determination result as to whether the document of the input image data is for landscape, that is, based on the determination result of the orientation of the document. However, the binding direction may be decided based on not the orientation of the document but other information. For example, the binding direction to be recommended may change depending on the sheet type, the sheet size, and the page layout. The document data D4 may include the determination conditions for these cases. For example, the document data D4 includes the information designating to perform the processing for portrait in Type B if the sheet type is glossy paper. In this case, the processing in step S307 is performed. As a result, by the setting for the printer driver, it is possible to execute printing while arranging the images such that the relationship between the top portion and the bottom portion of the image with respect to the side where binding is set is reversed between the obverse surface and the reverse surface, like the print result 702, if the sheet type is glossy paper.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-158763, filed Sep. 30, 2022, which is hereby incorporated by reference herein in their entirety.

What is claimed is:

1. An information processing apparatus comprising:
at least one processor; and
at least one memory storing a computer-readable program executable by the processor, wherein the at least one processor and the at least one memory are operatively coupled to function as:
an acquisition unit configured to acquire image data by an application for causing a printer corresponding to a printer driver to execute printing; and
a setting unit configured to, if an instruction to execute double-sided printing of the image data is accepted by the application, decide a binding setting of a document to print the image data based on information of the image data acquired by the acquisition unit, and set the decided binding setting for the printer driver.

2. The apparatus according to claim 1, wherein
the information of the image data includes a category of the image data, and
the setting by the setting unit is performed if the category of the image data is a predetermined category.

3. The apparatus according to claim 1, wherein
the setting by the setting unit includes being performed if an instruction from a user is accepted.

4. The apparatus according to claim 2, further comprising
a determination unit configured to determine, based on the information of the image data, whether the document is for portrait or for landscape,
wherein the setting by the setting unit is performed based on a result of the determination by the determination unit.

5. The apparatus according to claim 4, wherein
the information of the image data includes an aspect ratio of the document.

6. The apparatus according to claim 4, wherein
if it is determined that the document is for portrait, the setting unit decides the binding setting so as to bind a long side of the document.

7. The apparatus according to claim 4, wherein
if it is determined that the document is for landscape, the setting unit decides the binding setting so as to bind a short side of the document.

8. The apparatus according to claim 4, wherein
in a case in which the predetermined category is defined as a first category, and the category of the image data is a second category different from the first category,
if it is determined that the document is for portrait, the setting unit decides the binding setting so as to bind a short side of the document.

9. The apparatus according to claim 8, wherein
if it is determined that the document is for landscape, the setting unit decides the binding setting so as to bind a long side of the document.

10. The apparatus according to claim 8, wherein
a top-to-bottom orientation of an image with respect to a side where the binding setting is performed is reversed between a case in which the category of the image data is the first category and a case in which the category of the image data is the second category.

11. The apparatus according to claim 10, wherein
if the category of the image data is the first category, the top-to-bottom orientation of the image with respect to the side where the binding setting is performed is the same between an obverse surface and a reverse surface of the document.

12. The apparatus according to claim 11, wherein
if the category of the image data indicates the second category, the top-to-bottom orientation of the image with respect to the side where the binding setting is performed is reversed between the obverse surface and the reverse surface of the document.

13. The apparatus according to claim 1, wherein
if the binding setting of the document based on the image data acquired by the acquisition unit is different from a binding setting of a document designated by a user in the application, the setting unit sets, for the printer driver, the binding setting of the document decided based on the image data acquired by the acquisition unit regardless of the binding setting of the document designated by the user.

14. The apparatus according to claim 1, wherein the application is a Web application.

15. The apparatus according to claim 1, wherein the application is an application for printing a poster image.

16. A method to be executed by an information processing apparatus, the method comprising:
   acquiring image data by an application for causing a printer corresponding to a printer driver to execute printing; and
   if an instruction to execute double-sided printing of the image data is accepted by the application, deciding a binding setting of a document to print the image data based on information of the acquired image data, and setting the decided binding setting for the printer driver.

17. A non-transitory computer-readable storage medium storing a program configured to cause a computer to function to:
   acquire image data by an application for causing a printer corresponding to a printer driver to execute printing; and
   if an instruction to execute double-sided printing of the image data is accepted by the application, decide a binding setting of a document to print the image data based on information of the acquired image data, and set the decided binding setting for the printer driver.

18. An information processing apparatus comprising:
   at least one processor; and
   at least one memory storing a computer-readable program executable by the processor, wherein the at least one processor and the at least one memory are operatively coupled to function as:
      an acquisition unit configured to acquire image data by an application for causing a printer corresponding to a printer driver to execute printing; and
      a control unit configured to, if an instruction to execute double-sided printing of the image data is accepted by the application, control an image layout on an obverse surface and a reverse surface of a document to print the image data based on information of the image data acquired by the acquisition unit,
   wherein
   the control unit controls the image layout on the obverse surface and the reverse surface of the document by deciding, based on information of the image data, a binding setting of the document, and setting the decided binding setting for the printer driver.

19. A non-transitory computer-readable storage medium storing a program configured to cause a computer to function as:
   an acquisition unit configured to acquire image data by an application for causing a printer corresponding to a printer driver to execute printing; and
   a control unit configured to, if an instruction to execute double-sided printing of the image data is accepted by the application, control an image layout on an obverse surface and a reverse surface of a document to print the image data based on information of the image data acquired by the acquisition unit,
wherein
the control unit controls the image layout on the obverse surface and the reverse surface of the document by deciding, based on information of the image data, a binding setting of the document, and setting the decided binding setting for the printer driver.

* * * * *